United States Patent [19]

McGraw et al.

[11] Patent Number: 5,489,200
[45] Date of Patent: Feb. 6, 1996

[54] COMPRESS/MELT PROCESSOR FOR CONTAMINATED PLASTIC WASTE

[75] Inventors: Peter S. McGraw, Severna Park; John L. Drake, Jr., Arnold; Thomas H. Hane, Annapolis, all of Md.

[73] Assignee: The United States of America as represented by the Secretary of the Navy, Washington, D.C.

[21] Appl. No.: 350,068

[22] Filed: Nov. 29, 1994

Related U.S. Application Data

[62] Division of Ser. No. 128,410, Sep. 30, 1993, Pat. No. 5,411,697.

[51] Int. Cl.⁶ .......................... B29C 43/02; B30B 15/34
[52] U.S. Cl. .......................... 425/144; 100/50; 100/93 P; 100/99; 100/246; 425/149; 425/384; 425/407; 425/441; 425/DIG. 46
[58] Field of Search .................... 425/144, 149, 425/170, 384, 394, 398, 407, DIG. 46, 441; 100/50, 93 P, 92, 99, 240, 246

[56] References Cited

U.S. PATENT DOCUMENTS

| | | | |
|---|---|---|---|
| 3,383,228 | 5/1968 | Rekate et al. | 100/93 P |
| 4,453,905 | 6/1984 | Bennett | 425/192 R |
| 4,493,806 | 1/1985 | Hatzikelis et al. | 264/28 |
| 4,640,671 | 2/1987 | Wright | 425/149 |
| 4,860,958 | 8/1989 | Yerman | 100/93 P |
| 5,001,975 | 3/1991 | Finden | 100/93 P |
| 5,106,594 | 4/1992 | Held et al. | 422/292 |
| 5,185,126 | 2/1993 | Adamski et al. | 422/38 |
| 5,207,994 | 5/1993 | Suzuki et al. | 100/93 P |
| 5,236,655 | 8/1993 | de Soet | 264/320 |
| 5,240,656 | 8/1993 | Scheeres | 264/37 |
| 5,263,841 | 11/1993 | de Soet | 425/384 |

FOREIGN PATENT DOCUMENTS

| | | | |
|---|---|---|---|
| 53-130775 | 11/1978 | Japan | 264/37 |
| 55-135625 | 10/1980 | Japan | 264/37 |

OTHER PUBLICATIONS

*Mold–Making Handbook*, Klaus Stoeckhert, (p. 158), MacMillan Publishing (1983).

*Primary Examiner*—Robert B. Davis
*Attorney, Agent, or Firm*—Gary G. Borda

[57] ABSTRACT

A compress/melt waste processor includes a frame; a chamber housing having walls which define a chamber therein; a ram movably disposed in the chamber; a sensor which senses pressure applied by the ram; an actuator operatively connected to the ram to move the ram; a chamber hatch upon which the housing is mounted, the chamber housing walls, the ram and the chamber hatch defining a space therebetween; and a device for feeding contaminated plastic waste into the chamber. The apparatus also includes a device for heating the housing walls, the ram and the chamber hatch; a device for cooling the housing walls, the ram and the chamber hatch, a device for detecting temperature of the housing walls, the ram, the chamber hatch and the contaminated plastic waste in the chamber; and a control device for controlling the actuator and the heating and cooling devices. The control device activates the actuator so that the ram applies pressure to the contaminated plastic waste and also activates the heating device such that pressure and heat are concurrently applied to the plastic waste until the plastic waste reaches a predetermined temperature. The control device also activates the cooling device when a predetermined temperature has been reached in order to cool the heated plastic waste.

19 Claims, 7 Drawing Sheets

COMPRESS/MELT PROCESSOR FOR CONTAMINATED PLASTIC WASTE

STATEMENT OF GOVERNMENT RIGHTS

The invention described herein may be manufactured and used by or for the Government of the United States of America for governmental purposes without the payment of any royalties thereon or therefor.

CROSS REFERENCE TO RELATED APPLICATIONS

This application is a division of application Ser. No. 08/128,410, filed Sep. 30, 1993, now U.S. Pat. No. 5,411,697.

BACKGROUND OF THE INVENTION

1. Field of the Invention

The invention relates to an apparatus and a method for processing plastic waste which is contaminated with, for example, food, paper, and metal, into densified blocks in order to reduce the volume of such waste and the corresponding storage space associated therewith. More particularly, the inventive apparatus and method are directed toward processing plastic waste to produce a plastic slug that is suitable for long term sanitary storage.

2. Description of the Related Art

Navy ships generate plastic waste at a rate of approximately 0.1–0.2 pounds per man per day (0.045–0.09 Kg per man per day). This plastic waste is of very low density, approximately 1.4 pounds per cubic foot (22.4 Kg per cubic meter) and about 60% of this waste is heavily contaminated with food. Historically, all of this plastic waste has been discharged at sea, but this method of disposal has been ended due to its negative environmental impact.

The types of plastic waste typically encountered on ships are reflected in Table 1. Thus, any method or apparatus which is used to process such plastic must be capable of operating when the plastic waste includes a variety of different plastics which can also be contaminated with food, oil, water, metal and other non-plastics.

TABLE 1

SOURCES OF SHIPBOARD PLASTIC WASTE

| TYPE OF PLASTIC | | SOURCE |
| --- | --- | --- |
| SOFT | CELLOPHANE | FOOD AND CLOTHING PACKAGING |
| | POLYETHYLENE- POLYSTYRENE | PACKAGING, TRASH BAGS, FILM PACKAGING, FILMS |
| HARD | NYLON | MOLDED PARTS |
| | POLYETHYLENE TEREPHTHALATE (PET) | CONTAINERS |
| | POLYETHYLENE | CONTAINERS, MOLDED PARTS |
| | POLYSTYRENE | CONTAINERS, MOLDED PARTS |
| | POLYVINYL CHLORIDE | PIPING, HOUSINGS |
| FOAM | POLYETHYLENE | PACKAGING |
| | POLYSTYRENE | PACKAGING, PADS |
| | POLYURETHANE | PACKAGING, FOAM CUSHIONS |

However, existing technologies for processing and handling plastic waste, which include containment, pressure, heat, and screw type plastic recycling extruders, are highly sensitive to the type of plastic being processed and to any water, oil, and/or non-plastic contamination present. Moreover, each of these existing technologies has disadvantages associated therewith and all are suited to an open factory environment versus a confined environment such as on board a ship.

During containment, the plastic waste is placed in a heat shrinkable plastic bag and the ends of the bag are sealed with a heat gun. This results in the sanitary containment of the plastic waste, but does not reduce the volume of the plastic waste.

Pressure techniques such as that provided by a trash compactor can reduce the volume of waste. However, very high pressures in the order of 5,000 to 10,000 psi are required to produce an acceptable density level. The pressure compaction method is deficient in that no sterilization of the waste stream is provided. That is, while the contaminated mixed plastic waste is compacted to have a reduced volume, it is not in a sanitary inert form such that it can be stored for a long period of time without creating a health hazard. Thus, the compressed contaminated plastic must be disposed of in a short period of time. Moreover, when the compressed waste (slugs) are handled, they tend to flake apart creating an unsanitary condition. In addition, based on testing conducted by applicants, it was determined that no amount of pressure could maintain the slugs in their compressed shape for more than five minutes. That is, due to the elastic memory of the plastic waste only a moderate permanent reduction in volume occurs. In order to overcome this problem, the compacted plastic waste can be banded immediately after compression. However, this requires a subsequent labor intensive step.

Heating the plastic waste and allowing it to cool can increase the density (reduce the volume) of the plastic waste. However, extremely high temperatures of approximately 450° F. are required to produce any significant reduction in the volume of the plastic waste. Moreover, there is a limit as to how high a temperature can be applied in order to prevent the creation of unpleasant or noxious fumes that can be generated if oils and other materials begin to burn. Furthermore, even at 450° F. the density of the heat-formed slug is still less than that produced by the compaction technique at 10,000 psi.

Plastic screw type extruding systems, such as those used in the recycled plastics industry, require the plastic waste to be carefully sorted, washed, and dried prior to being processed. These processes are very labor, time and space intensive. In addition, plastic extruding systems have not been used for processing plastic heavily contaminated with food, oil and non-plastic components. Oil, either from machinery spaces or food oil containers, would likely reduce the friction within the screw type extruder. Such friction is, however, essential for the melting that takes place within the extruding system, and therefore, any reduction of friction would form a slug of unknown properties. Furthermore, any metal contamination of the plastic waste would likely damage the extruding system. That is, the screw type extruder requires very tight tolerances. A piece of metal, such as a knife, in the plastic waste being processed would severely damage a screw extruder. Another problem with extruding systems occurs if the processed plastic is wet. The wet plastic can cause a vapor lock such that the plastic stream exiting the extruder would be foam or would have steam explosions.

Consequently, screw type extruding systems require the waste introduced therein to be sorted and cleaned prior to entering the system in order to help prevent the above-mentioned problems from occurring. The sorting operation could be done manually or accomplished by using metal detectors. In addition, a shredder can be added to the extruder system to shred the incoming waste such that contaminates are finely ground so that they no longer threaten damaging the screw extruder. In any event, the use of an extruding system requires extensive and costly preparation of the incoming waste prior to its subsequent processing.

Additional equipment used for municipal waste streams such as balers, are typically very large and provide no means of sterilizing the waste stream without some type of covering or strapping.

It is readily apparent that the prior art lacks a method and apparatus which are simple in design and which allow for contaminated mixed plastic waste to be processed into a sanitary inert form such that it can be stored for a long time without creating a health hazard.

SUMMARY OF THE INVENTION

It is an object of the invention to provide a simply constructed and compact apparatus for processing mixed plastic contaminated with food, oil, metal and other non-plastics, to produce an end product which is compact, sanitized and capable of extended storage without creating a sanitary problem.

This object is met by providing a compress/melt waste processor including a frame; a chamber housing having walls; a chamber hatch upon which the chamber housing is mounted, wherein the housing walls and the chamber hatch define a chamber therein; a ram movably disposed in the chamber, wherein the housing walls, the chamber hatch and the ram define a space therebetween; means for feeding contaminated plastic waste into the space; an actuator operatively connected to the ram to move the ram, wherein the actuator operates to move the ram into contact with the contaminated plastic waste such that a compaction pressure is applied to the contaminated plastic waste; means for heating the housing walls, the ram and the chamber hatch; means for sensing the compaction pressure applied by the ram; means for detecting temperature of the housing walls, the ram, the chamber hatch and the contaminated plastic waste in the chamber; and control means, responsive to input signals received from the pressure sensing means and the temperature detecting means, for controlling the actuator and the heating means.

The control means controls the actuator and the heating means such that 1) at times when the contaminated plastic waste is fed into the space, the control means controls the actuator to cause the ram to apply a first compaction pressure to the contaminated plastic waste within the space such that the contaminated plastic waste is compacted to form a slug, 2) upon the first compaction pressure being obtained, and while continuing to cause the ram to compact the slug at the first compaction pressure, the control means activates the heating means to heat the housing walls, the ram, and the chamber hatch to a predetermined temperature whereby at least a portion of the slug is melted, 3) upon the housing walls, the ram, and the chamber hatch reaching the predetermined temperature, and while continuing to cause the heating means to heat the housing walls, the ram, and the chamber hatch at the predetermined temperature, the control means controls the actuator such that the ram compacts the slug at a second compaction pressure, and 4) upon the slug exceeding a predetermined internal temperature, the control means deactivates the heating means while continuing to control the actuator such that the ram continuously compacts the slug until the melted portion of the slug has cooled sufficiently to harden.

It is a further object of the invention to provide a method for processing mixed plastic contaminated with food, oil, metal and other non-plastics, to produce an end product which is compact, sanitized and capable of extended storage without creating a sanitary problem.

This object is met by providing a method including feeding the contaminated plastic waste into a chamber defined by a plurality of walls; compacting the contaminated plastic waste within the chamber by applying a compaction pressure thereto, the compacted plastic waste forming a slug; directly heating all outer surfaces of the slug while concurrently continuing compacting of the slug; melting at least some of the contaminated plastic waste of the slug due to the heating such that a melted layer forms along all the outer surfaces of the slug encapsulating unmelted portions of the slug within the melted layer; cooling the slug while continuing compacting the slug until the melted layer hardens to form a plastic coating at all the outer surfaces of the slug which encapsulates all remaining portions of the slug; and ejecting the cool slug from the chamber.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated and constitute part of the specification, illustrate a presently preferred embodiment of the invention, and together with the general description given above and a detailed description of the preferred embodiment given below, serve to explain the principles of the invention.

DETAILED DESCRIPTION OF THE PREFERRED EMBODIMENTS

Figure 1:
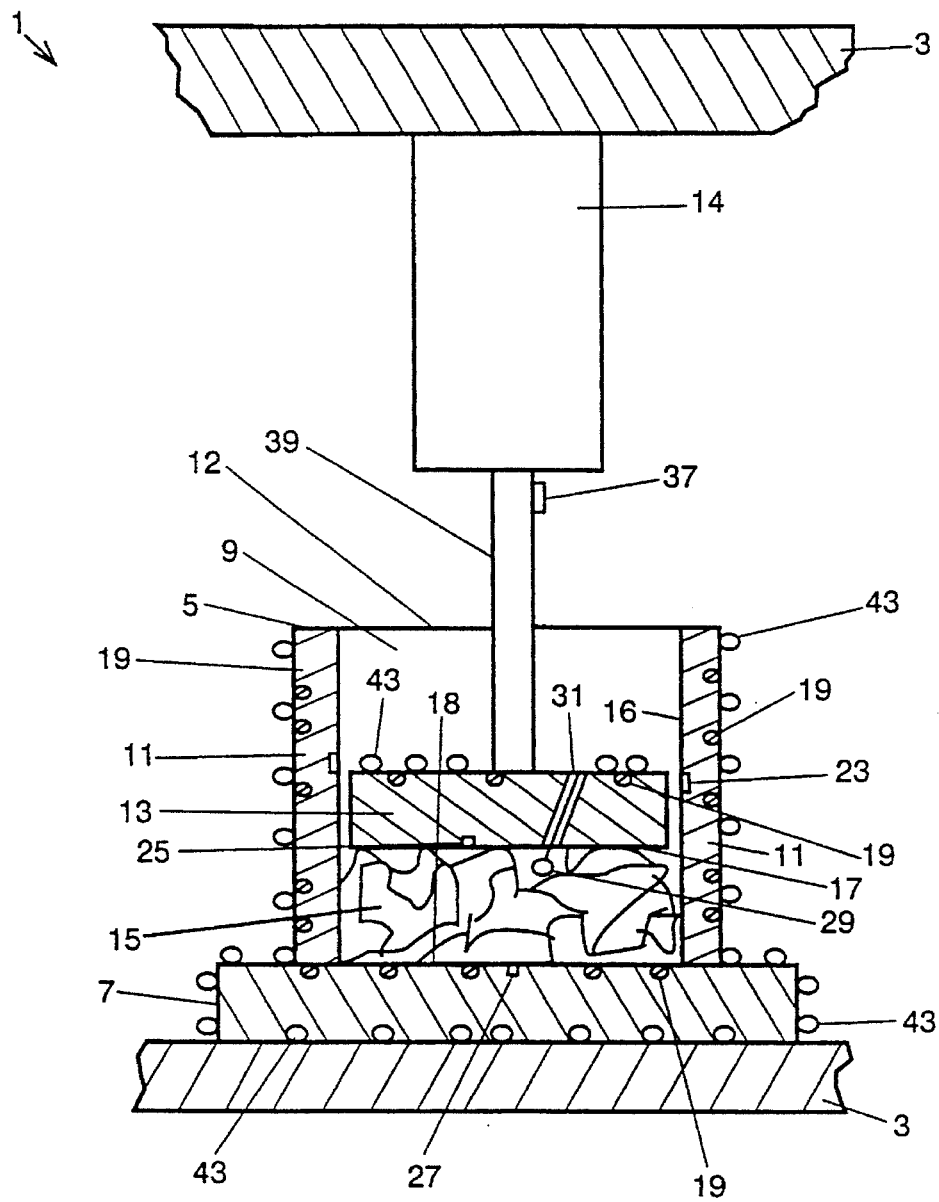
FIG. 1 is a schematic cross-sectional view of the inventive apparatus.
Figure 1:
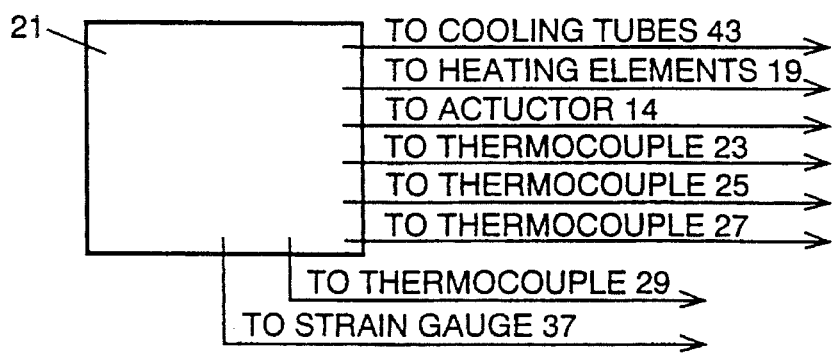

In FIG. 1, the compress/melt plastic waste processor 1 is shown as including a frame assembly 3 which supports all of the other components of the compress/melt plastic waste processor 1. A compress/melt chamber housing 5 is disposed on top of a chamber hatch 7 to define a chamber 9 between the walls 11 of the compress/melt chamber housing 5 and the chamber hatch 7. Chamber 9 has an open end 12 through which mixed plastic waste contaminated with, for example, food, oil, metal and other non-plastics, can be placed in chamber 9. A compaction ram 13 is operably connected to a linear actuator 14 such that the actuator 14 can move the compaction ram 13 within the chamber 9. Thus, the compaction ram 13 can be moved into contact with the contaminated mixed plastic waste in the chamber 9 in order to compress/compact the contaminated mixed plastic waste against the chamber hatch 7 thereby forming a slug 15 (densely packed contaminated plastic waste) out of the contaminated mixed plastic waste. All of the outer surfaces of the slug 15 are forced against corresponding inner surfaces 16, 17, 18 which are respective inner surfaces of the chamber housing walls 11, the compaction ram 13 and the chamber hatch 7. The actuator 14 could, for example, be a hydraulic cylinder, a pneumatic cylinder, ball screws, or some other mechanical or electro-mechanical actuator.

The walls 11 of the compress/melt chamber housing 5, the compaction ram 13 and the chamber hatch 7 are all controllably heated by heat sources 19 which can be embedded or clamped in place on each of the aforementioned structures. Heat sources 19 may be any appropriate heating device capable of heating walls 11, compaction ram 13 and the chamber hatch 7 as, for example, conventional electric resistive heating elements. In FIG. 1, the heat sources 19 are shown as being embedded in place. The heat sources 19 could also be in the form of a heat blanket. Alternatively, instead of using electric resistive elements, rings or tubes, having steam or heated fluid therein, can be disposed around or formed in the chamber housing walls 11, the compaction ram 13 and chamber hatch 17. The steam or heated fluid would be heated by a conventional external source and continually circulated to perform the required heating.

Control of the heating of the walls 11, the compaction ram 13 and chamber hatch 7 can either be manual or automatic. In FIG. 1, a controller 21, such as a computer, is operatively connected to temperature detecting means such as thermocouples 23, 25 and 27 which continually send a signal, representative of the temperature of the structure in which they are embedded, to the controller 21. Alternatively, resistive temperature devices (RTU's) or other appropriate temperature sensing devices can be used instead of or in combination with thermocouples 23, 25 and 27. The controller 21 which is connected to the heat sources 19 can be programmed to turn the heat sources 19 on and off depending on whether the signals from the thermocouples 23, 25 and 27 are above or below a predetermined value. In this manner, the temperature of the walls 11, compaction ram 13 and chamber hatch 7 are controlled.

In a manual mode, the temperature readings from the thermocouples 23, 25, 27 could be displayed on a monitor (not shown) such that an operator could turn power to the heat sources 19 on and off based on the temperature readings.

An additional thermocouple 29 can be passed through an opening 31 in compaction ram 13 and secured in place so that it extends outward from inner wall 17 and into slug 15. Thermocouple 29 is operatively connected to controller 21 and provides a signal thereto which is indicative of the approximate temperature at the approximate center of slug 15.

The compaction ram 13, compress/melt chamber walls 11, and chamber hatch 7 are all heated during the operation of the compress/melt plastic waste processor as discussed in more detail below, in order to ensure that all of the outer surfaces of the slug 15 which contact a corresponding one of the inner surfaces 16, 17, 18 are melted during heating.

It is to be noted that upon the melting and subsequent cooling of the plastic waste material within the compress/melt plastic waste processor, the slug 15 is formed with a final hardened shape. The cross-sectional shape of the compaction ram 13, the compress/melt chamber housing 5 and the chamber hatch 7 will determine the final shape of the slug 15. The cross-sectional shape of these components can, for example, be oval, cylindrical, triangular, rectangular or any other desired shape. The geometry of the top and bottom faces of the slug will be determined by the faces of the compaction ram 13 and the chamber hatch 7. Thus, the compaction ram 13 and the chamber hatch 7 can be manufactured, for example, to produce flat or cup shaped slugs.

Figure 6:
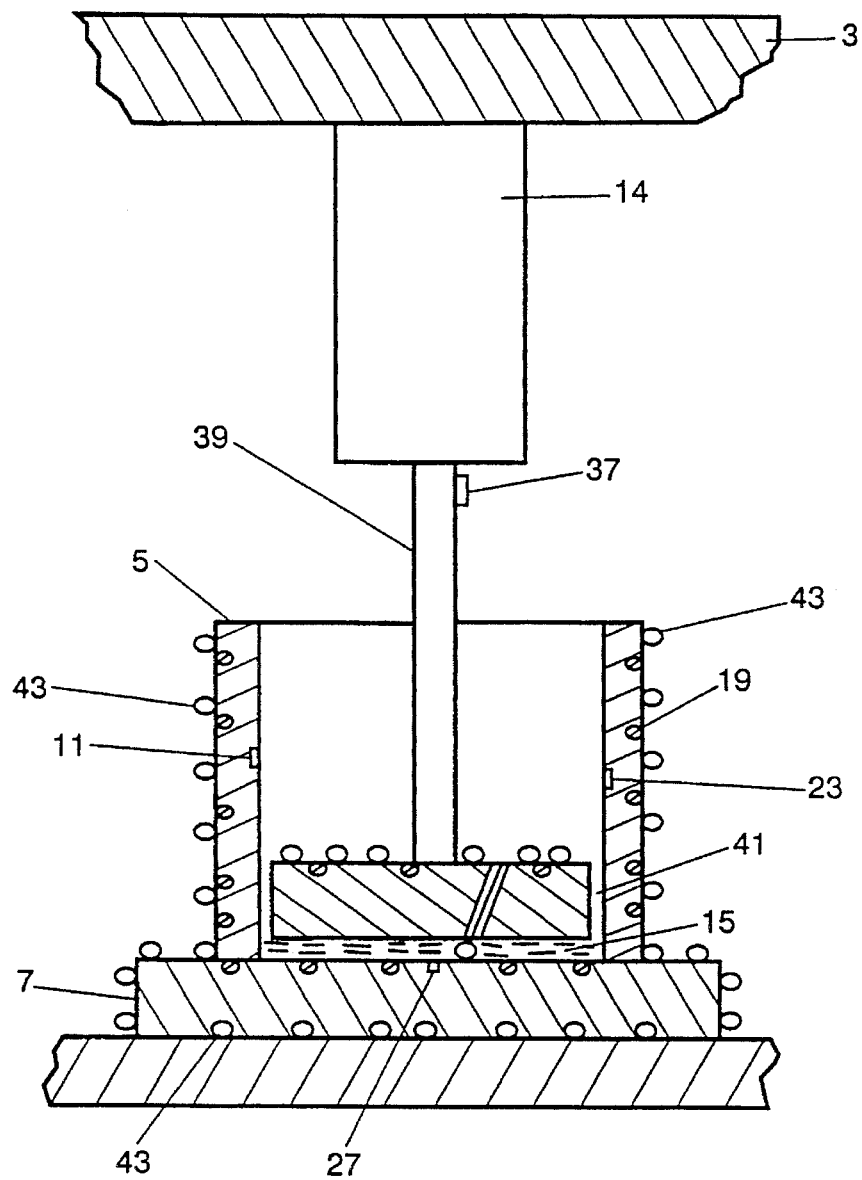
Figure. 6 is a schematic cross-sectional view of the inventive apparatus of FIG. 1 during a cooling step.
Figure 6:
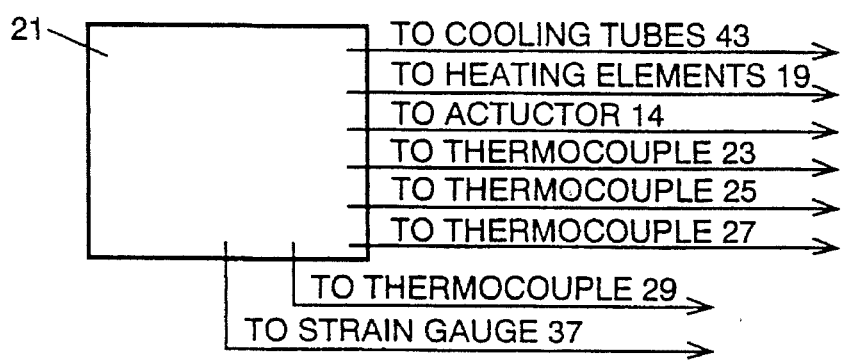
Figure 7:
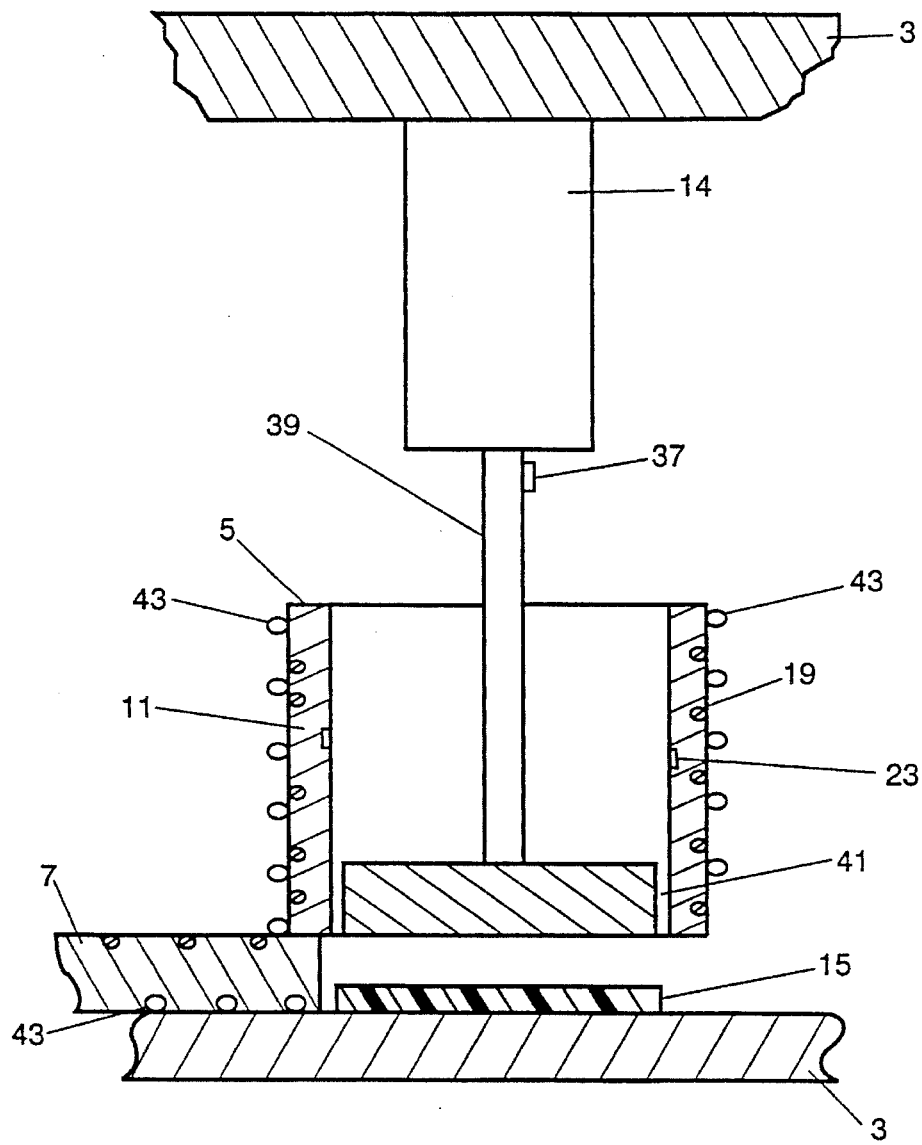
FIG. 7 is a schematic cross-sectional view of the inventive apparatus of FIG. 1 during an ejection step.
Figure 7:
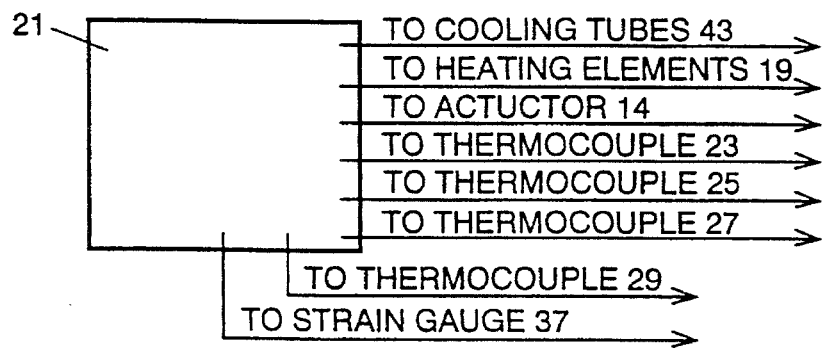

In order to more fully understand the claimed invention, the operation of the apparatus will be described with reference to FIGS. 2–7. With respect to the figures, FIGS. 2 and 3 show the apparatus in an initial feed step, FIG. 4 shows the apparatus in a compress step, FIG. 5 shows the apparatus in a compress/melt step, FIG. 6 shows the apparatus in a cooling step, and FIG. 7 shows the apparatus in an ejection step.

Figure 2:
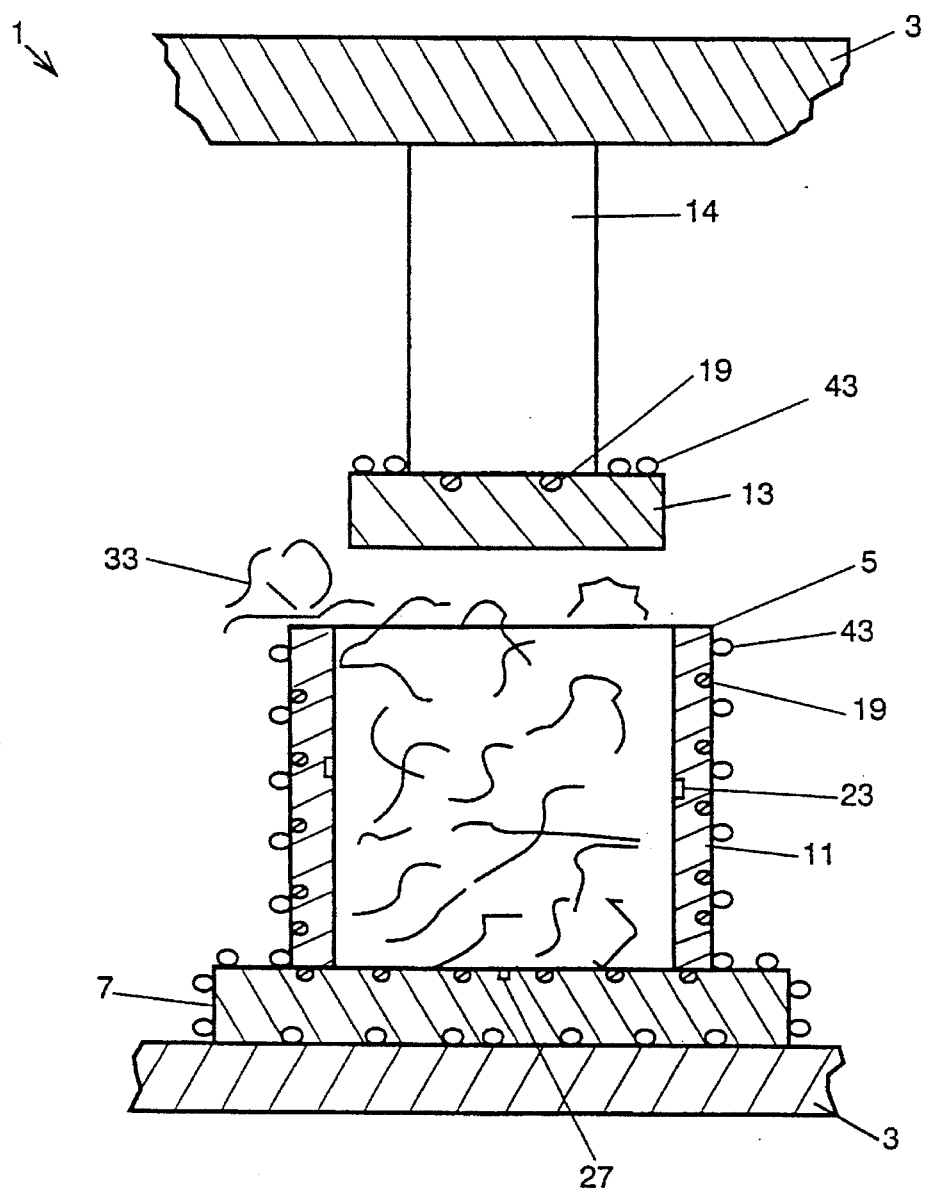
FIG. 2 is a schematic cross-sectional view of the apparatus of FIG. 1 during an initial feed step.
Figure 2:
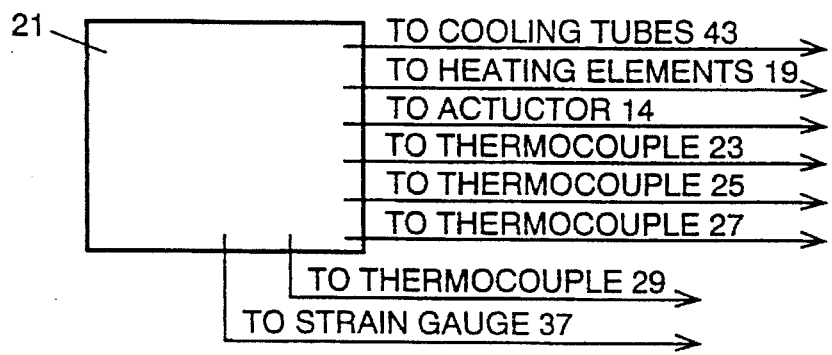
Figure 3:
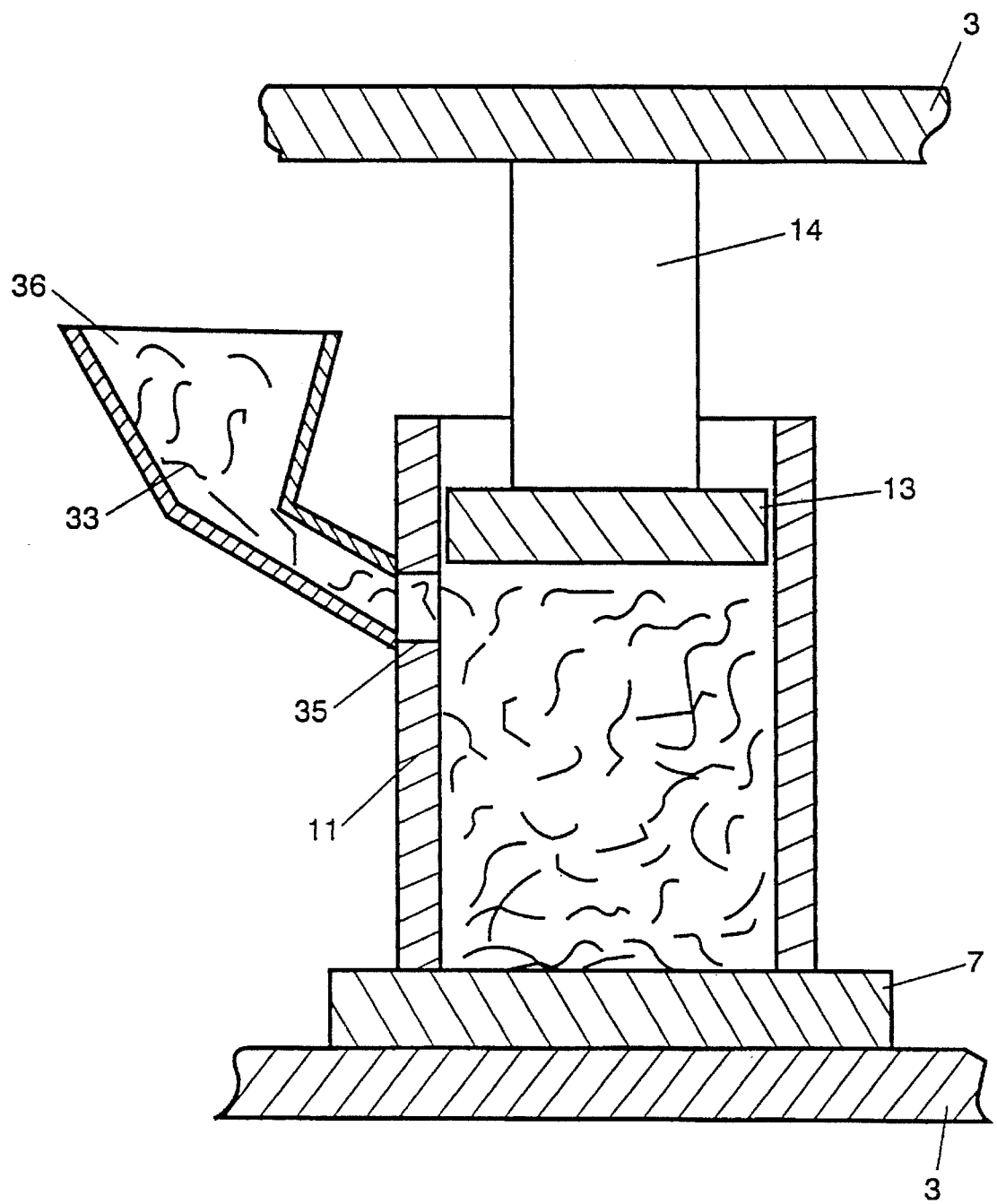
FIG. 3 is a schematic cross-sectional view of a second embodiment of the apparatus during an initial feed step.

In FIG. 2, the linear actuator 14 has been operated to retract the compaction ram 13 out of chamber 9. This allows the plastic waste feed 33 to be placed in the chamber 9 via the open end 12 in the top of the compress/melt chamber housing 5. In FIG. 3, a second embodiment is shown in which the compaction ram 13 has been retracted by the linear actuator 14 above an opening 35 in one of the walls 11 of the compress/melt chamber housing 5. Thus, the plastic waste feed 33 is inserted into the chamber 9 via the opening 35. A chute 36 is shown as a means for feeding the plastic waste feed 33 into opening 35. However, any conventional feeding means could be used including manual feeding.

Figure 4:
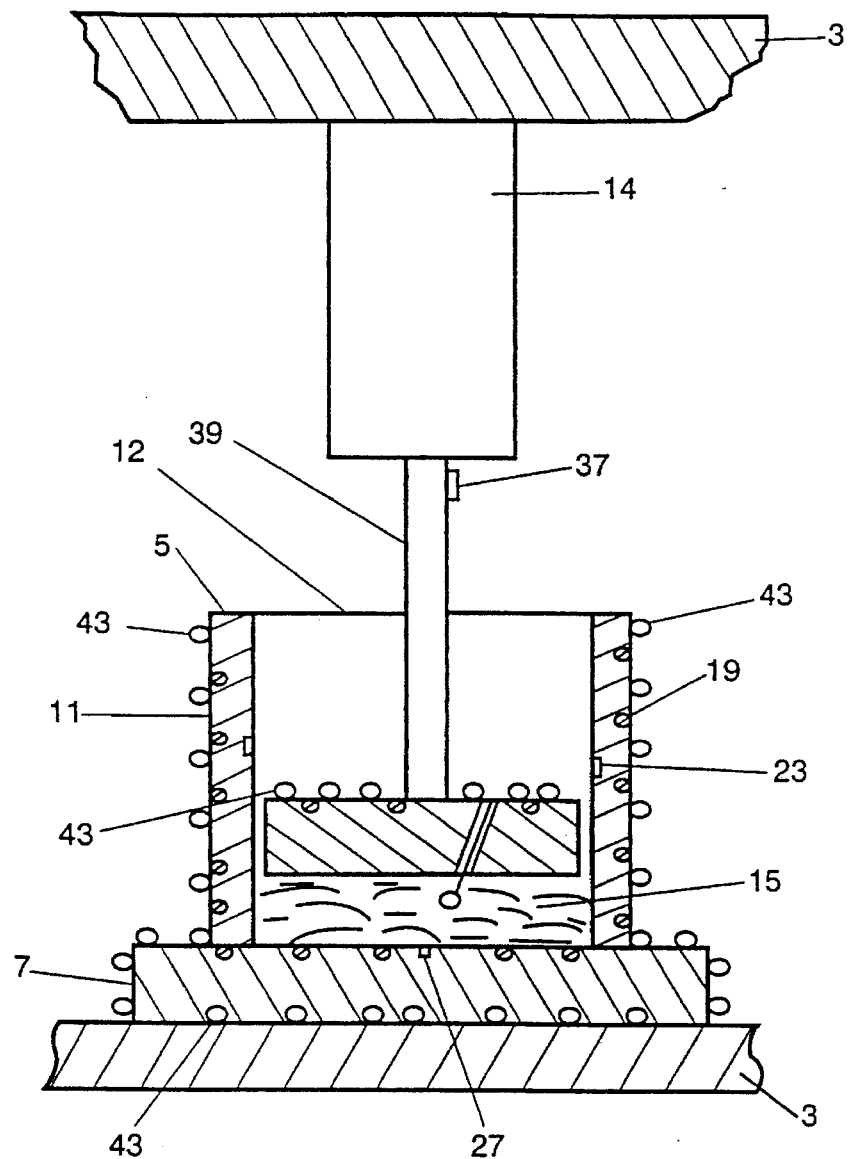
FIG. 4 is a schematic cross-sectional view of the inventive apparatus of FIG. 1 during a compact/compress step.
Figure 4:
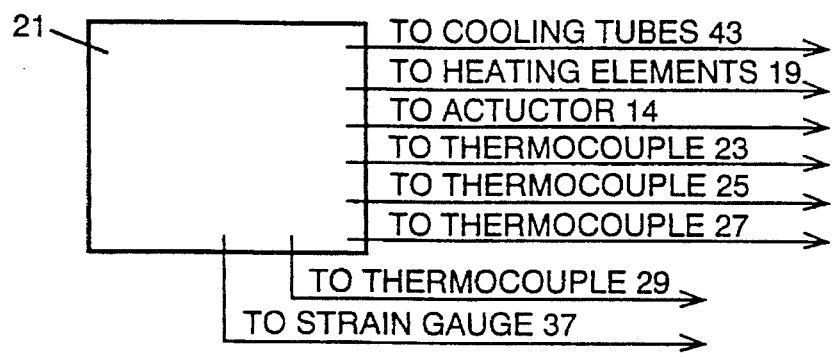

As shown in FIG. 4, once a certain amount of plastic waste feed 33 has been placed in the chamber 9, the compaction ram 13 is lowered by the linear actuator 14 in order to compress the plastic waste feed 33 into a slug 15. This compression step is performed without any heat being applied to the chamber hatch 7, the compaction ram 13, and the compress/melt chamber walls 11. The feed and compress steps of FIGS. 2, 3, and 4 are repeated as required until a slug 15 is produced of a desired thickness and at a desired pressure. That is, the plastic waste feed 33 is compressed until a preferable compaction pressure of approximately 40 to 50 psi (2810 to 3515 g/cm$^2$), is achieved. The actuator 14 is operatively connected to the controller 21. In addition, a means for sensing the compaction pressure, such as a strain gauge 37 mounted on a piston rod 39, is also connected to the controller 21. The controller 21 can then control the actuator 14 and the applied pressure based on feedback from the strain gauge 37. A load cell or other known pressure measuring device may be used in place of or in combination with strain gage 37. Alternatively, when actuator 14 is a hydraulic or pneumatic actuator, compaction pressure sensing can be achieved by monitoring the hydraulic pressure or air pressure therein.

Figure 5:
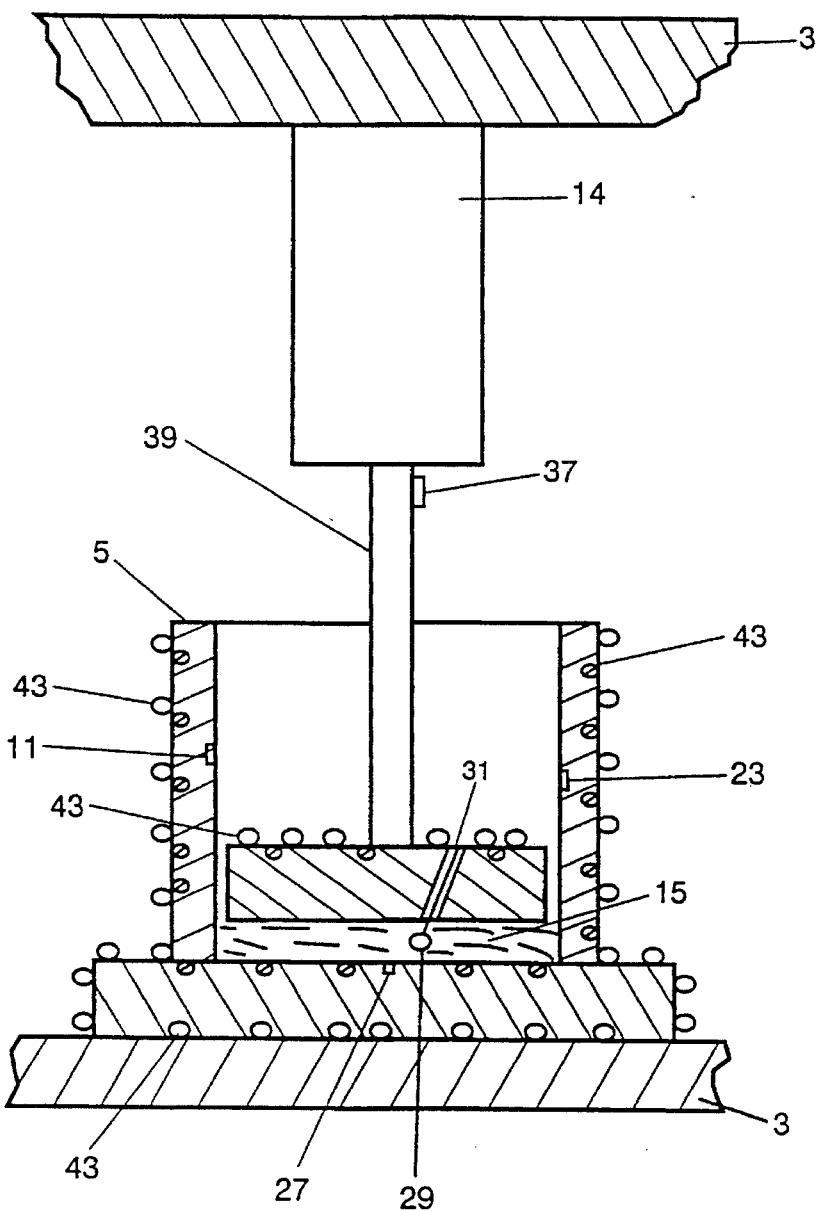
FIG. 5 is a schematic cross-sectional view of the inventive apparatus of FIG. 1 during a compress/melt step.
Figure 5:
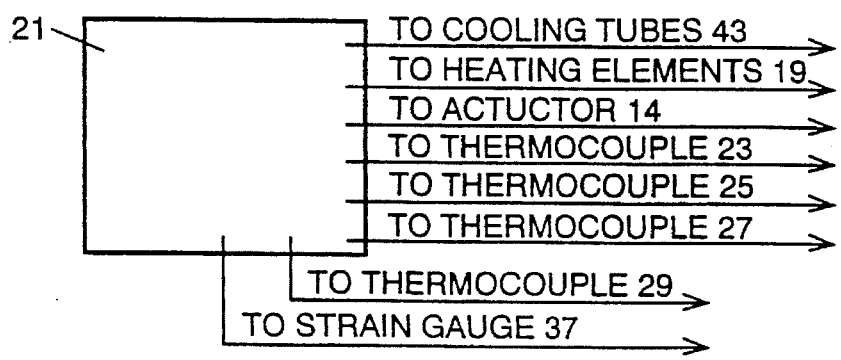

Once a sufficient amount of plastic waste feed has been introduced into the compress/melt chamber housing 5 in order to produce a slug 15 at the desired thickness and desired compaction pressure, the compress/melt step as shown in FIG. 5 begins. During this step, heat is applied to the compaction ram 13, the compress/melt chamber housing 5 and the chamber hatch 7 via the heat sources 19. The respective inner surfaces 16, 17 and 18 of the walls 11, compaction ram 13 and chamber hatch 7 must be heated to a temperature sufficient to melt the bulk of the plastic waste and to boil off any liquid trapped on the plastic waste, but must not be high enough to ignite any of the plastic waste nor produce any hazardous fumes associated with the burning of the waste. A temperature range of approximately 325° F. to 350° F. (163°–177° C.) is preferable in that it is sufficient to melt the major constituent, polyethylene, of the typical navy ship and municipal plastic waste stream and to drive the thermal conductivity required to heat the entire slug 15. Moreover, as the temperature gets closer to 400° F., the burning of oils and paper will produce smoke while the burning of Teflon, polyurethanes and polyvinyl chlorides will produce hazardous fumes. As the heat is being applied, the linear actuator 14 concurrently moves the compaction ram 13 thereby compressing the slug 14 to an even thinner thickness.

At a point when the contaminated plastic waste begins to soften due to the heat and compaction pressure, the compaction pressure can be reduced (though it is not necessary) to approximately 20 psi (1405 g/cm$^2$). The reduction in pressure helps to prevent the melted plastic from being forced into the gap 41 which exists between the compaction ram 13 and the walls 11 of the compress/melt chamber housing 5. The prevention of melted plastic from entering gap 41 is important because during this process, it is desirable to heat all of the slug 15 to a point where all of the moisture contained therein is evaporated. The time required to get heat to the center of the slug 15 is dependent on the temperature of all of the heated surfaces 16, 17, 18 and on the distance from the heated surfaces 16, 17, 18 to the center of the slug 15. Increasing the compaction force by the actuator 14 and the compaction ram 13 compresses the slug 15 thereby reducing the distance to the center of the slug. However, if excessive compaction force is used, the melted plastic would fill the gap 41. If the gap 41 is filled by melted plastic, any steam generated by the heating of the slug 15 has no means to escape from chamber 9 in order to allow the slug 15 to dry. Moreover, if melted plastic enters the gap 41, it will solidify therein during the below described cooling step. This will produce "flashing" around the edges of the finally formed slug 15 which makes it more difficult to remove slug 15 from chamber 9 and to stack the slugs 15 during their subsequent storage.

The compress/melt step continues until the temperature at the center of the slug 15 exceeds the boiling point of water, at which time almost all of the moisture in the plastic waste should be evaporated. The compress/melt step is further continued to a point where the slug is surrounded by a minimum of a quarter of an inch of a melted plastic layer. The melted plastic layer is measured as extending from all of the inner surfaces 16, 17, and 18. In a typical Navy mixture of plastic waste which is primarily made up of polyethylene, polypropylene, polystyrene, and food contaminates, the melted plastic layer encapsulates any unmelted plastic, food and non-plastic materials, including metal pieces, which may be part of the waste.

Once the compress/melt step has been completed, a cooling step commences. As shown in FIG. 6, cooling tubes 43 are disposed around chamber walls 11, compaction ram 13, and chamber hatch 7, and supplied with cooling water or cooling oils in order to cool the respective components about which they are disposed. The cooling tubes 43 can be mounted to the outside of the component being cooled such as shown in FIG. 6 for the compaction ram 13 and the chamber walls 11, or can be integrally formed within a component as shown for chamber hatch 7. The circulation of the cooling fluid is conventional and will not be further described. However, the controller 21 can be used to control the flow of fluids by being connected to, for example, a solenoid valve. Additional cooling techniques such as using forced air or simply allowing cooling to take place passively can be used in lieu of the cooling tubes.

During the entire cooling process, the compaction ram 13 continues to actively compress the slug 15. Cooling continues until the core of the slug is below 212° F. (100° C.) so that if there is any remaining steam, it is condensed thereby preventing any steam explosions when the slug 15 is subsequently ejected from the compress/melt chamber. Moreover, the slug 15 is not ejected from the compress/melt chamber until the surface of the slug 15 is cooled to a point where the melted plastic layer has hardened and has the majority of its stiffness, thereby preventing the slug from deforming during or after ejection. In the typical mix of plastics used by the Navy as discussed above, experience has shown that when the temperature of the inner surfaces 16, 17 and 18 have cooled to approximately 140° F., the required slug stiffness has been achieved. At this point in time, the entire slug 15 has a hardened plastic covering formed from the cooled melted layer.

As shown in FIG. 7, the chamber hatch 7 is slidably mounted on the frame 1 and can be moved from a position directly below the compress/melt chamber housing 5 in order to permit the linear actuator 14 to move the compaction ram 13 to eject the end product slug 15 from the compress/melt chamber housing 5. The compress/melt chamber housing 5 can be securely mounted to the frame 3 or movably mounted thereto. In the situation where the compress/melt chamber housing 5 is fixably mounted in place, it could for example, have wedged grooves therein which receive corresponding wedges on the chamber hatch 7 so that when the chamber hatch 7 is slid into place directly below the compress/melt chamber housing 5, the compress/melt chamber housing 5 and chamber hatch 7 are securely connected to each other. The movement of the chamber hatch 7 beneath the compress/melt chamber housing 5 could be manually accomplished or can be accomplished through the use of a linear actuator.

If the compress/melt chamber housing 5 is movably mounted to the frame 3, the tongue and groove arrangement between the compress/melt chamber housing 5 and the chamber hatch 7 can be eliminated and, for example an additional linear actuator could be connected to the compress/melt chamber housing 5 and the frame 3 in order to move the compress/melt chamber housing 5 into and out of contact with the chamber hatch 7.

The vertical apparatus structure shown in the figures could be inverted or could also be horizontally oriented. In either of these configuration the chamber hatch 7 could be hingedly mounted to the compress/melt chamber housing 5 in a conventional manner such that it opens and closes as a door.

In a preferred embodiment, the respective inner surfaces 16, 17, 18, of the compress/melt chamber housing walls 11, the compaction ram 13 and the chamber hatch 7 are smooth thermally conductive surfaces such as, for example, hard polished aluminum, which helps to prevent the slug 15 from sticking thereto. In another embodiment, the hard polished aluminum may be anodized. However, additional conventional non-stick surfaces or coatings can be used in lieu thereof.

The above-discussed method and apparatus for processing plastic waste offers simplicity in design. In its simplest form, the inventive apparatus incorporates only two moving parts, the compaction ram 13, and the chamber hatch 7. The controls required to operate the inventive apparatus are only temperature controls for the heat sources 19 and a force pressure control for the linear actuator 14. The inventive process has a very high tolerance to variations in plastic waste content. The process works just as well for mixed plastic waste with non-plastic mixed in, as for a clean and pure plastic infeed as required for devices such as extruders. The inventive process greatly increases the infeed plastic waste density such that a 30 to 1 reduction in volume is obtained. Thus, the plastic waste can be efficiently stored and cost effectively transported commercially for recycling or disposal. Moreover, any food waste in the plastic waste feed stream is dehydrated during the heating of the slug thereby providing a product that can be stored for extended periods of time without any sanitation problems. Furthermore, the slug contains any unsanitary items within its plastic covering. No other conventional method for handling plastic waste combines the simplicity of the instant design with the ability to produce dense slugs of plastic waste that are suitable for long term sanitary storage. Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents. For example, while the preferred embodiment is directed toward a mix of plastic waste typically encountered in a Navy environment, the apparatus and method can be modified to work on other plastic mixes by adjusting the temperatures and pressures used. Additionally, a convemual shredding device can be added to the apparatus to shred the contaminated plastic waste prior to feeding the waste into the chamber. The shredder permits large objects to be reduced in size so that they do not prevent compaction of the plastic waste. Such modifications are well within the ability of those skilled in the art without requiring undue experimentation.

What is claimed is:

1. A compress/melt waste processor for processing a first volume of contaminated plastic waste to produce a second volume of a sanitary end product suitable for long-term storage, comprising:

a frame;

a chamber hatch mounted upon said frame;

a chamber housing having walls, said chamber housing mounted upon said chamber hatch, wherein said housing walls and said chamber hatch define a chamber therein;

a ram movably disposed in said chamber, wherein said housing walls, said chamber hatch and said ram define a space therebetween, and further wherein said ram and said housing walls define a gap therebetween for allowing steam to escape said chamber;

means for feeding said first volume of contaminated plastic waste into said space;

means mounted to said frame and operatively connected to said ram for compacting said first volume of contaminated plastic waste, said compacting means functioning to cause said ram to apply a first predetermined compaction pressure to the contaminated plastic waste to form a slug and to apply a second predetermined compaction pressure to said slug;

means for heating said housing walls, said ram and said chamber hatch to a predetermined temperature sufficient to melt at least an outer layer of the contaminated plastic waste without igniting the contaminated plastic waste nor producing hazardous fumes associated with the burning of the contaminated plastic waste and sufficient to cause an internal temperature of said slug to exceed a predetermined internal temperature wherein liquids trapped in the contaminated plastic waste are evaporated out through said gap, said predetermined internal temperature being measured at approximately a center of said slug;

means for sensing said compaction pressures applied by said ram;

means for detecting said predetermined internal temperature of said slug and said predetermined temperature of at least one of said housing walls, said ram and said chamber hatch; and control means, responsive to input signals received from said pressure sensing means and said temperature detecting means, for controlling said compacting means and said heating means, said control means functioning to control said compacting means and said heating means such that 1) said ram applies said predetermined first compaction pressure to said first volume of contaminated plastic waste, 2) upon said predetermined first compaction pressure being obtained, said heating means is activated to heat said housing walls, said ram, and said chamber hatch to said predetermined temperature, 3) upon said housing walls, said ram, and said chamber hatch reaching said predetermined temperature, said ram applies said predetermined second compaction pressure to said slug, and 4) upon said predetermined internal temperature being exceeded, said heating means is deactivated while said ram continuously compacts said slug at said predetermined second compaction pressure until said melted outer layer of said slug has cooled sufficiently to harden, wherein said processor functions to compact said first volume of contaminated plastic into a sanitary slug of said second volume and wherein a ratio of said first volume to said second volume is about 30:1.

2. A compress/melt waste processor as recited in claim 1, wherein said heating means comprises electric resistive elements disposed within said ram, said chamber hatch and said housing walls.

3. A compress/melt waste processor as recited in claim 1, wherein said heating means comprises electric resistive elements disposed around an outside surface of each of said ram, said chamber hatch and said housing walls.

4. A compress/melt waste processor as recited in claim 1, further comprising a means for cooling said housing walls, said ram and said chamber hatch, and further wherein said control means controls said cooling means such that upon said control means deactivating said heating means said control means activates said cooling means.

5. A compress/melt waste processor as recited in claim 4, wherein said cooling means includes tubes disposed within said ram, said chamber hatch and said housing walls, said tubes having a cooling fluid passing therethrough.

6. A compress/melt waste processor as recited in claim 4, wherein said cooling means includes tubes disposed around an outside surface of each of said ram, said chamber hatch and said housing walls, said tubes having a cooling fluid passing therethrough.

7. A compress/melt waste processor as recited in claim 1, wherein inner surfaces of said chamber hatch, said ram and said housing walls which surround said space are all formed from hard polished aluminum.

8. A compress/melt waste processor as recited in claim 1, wherein said compacting means comprises a linear actuator chosen from the group consisting of a hydraulic cylinder, a pneumatic cylinder, and ball screws.

9. A compress/melt waste processor as recited in claim 1, wherein said chamber hatch is slidably mounted upon said frame between a first position defining said chamber and a second position laterally removed from said first position and defining an opening such that when said chamber hatch is at said first position said ram applies said compaction pressures to the contaminated plastic waste and when said chamber hatch is at said second position said ram ejects said slug from said chamber housing through said opening.

10. A compress/melt waste processor as recited in claim 1, wherein said compacting means functions to compact the contaminated plastic waste to said first and second predetermined compaction pressures of between approximately 40 psi and 50 psi.

11. A compress/melt waste processor as recited in claim 1, wherein said compacting means functions to compact the contaminated plastic waste to said first predetermined compaction pressure of between approximately 40 psi and 50 psi and said second predetermined compaction pressure of approximately 20 psi.

12. A compress/melt waste processor as recited in claim 1, wherein said heating means functions to heat said housing walls, said ram, and said chamber hatch to said predetermined temperature of between approximately 325° F. to 350° F.

13. A compress/melt waste processor as recited in claim 1, wherein said heating means functions to heat said slug to said predetermined internal temperature of approximately 212° F.

14. A compress/melt waste processor for processing contaminated plastic waste to produce a sanitary end product suitable for long-term storage, comprising:

a frame;

a chamber hatch mounted upon said frame;

a chamber housing having walls, said chamber housing mounted upon said chamber hatch, wherein said housing walls and said chamber hatch define a chamber therein;

a ram movably disposed in said chamber, wherein said housing walls, said chamber hatch and said ram define a space therebetween;

means for feeding a first volume of contaminated plastic waste into said space;

means operatively connected to said ram for compacting said first volume of contaminated plastic waste into a second volume of contaminated plastic waste, said compacting means being an actuator functioning to cause said ram to apply a first predetermined compaction pressure of between approximately 40 psi and 50 psi and a second predetermined compaction pressures of between approximately 20 psi and 50 psi to the contaminated plastic waste;

means for heating said housing walls, said ram and said chamber hatch to a predetermined temperature of between approximately 325° F. and 350° F. wherein said heating functions to raise an internal temperature of the contaminated plastic waste to a predetermined internal temperature at approximately a center of the contaminated plastic waste of 212° F.;

means for cooling said housing walls, said ram and said chamber hatch;

a sensor for sensing said first and second predetermined compaction pressures applied by said ram;

means for detecting said predetermined internal temperature of the contaminated plastic waste and said predetermined temperature of at least one of said housing walls, said ram and said chamber hatch; and control means, responsive to input signals received from said sensor and said temperature detecting means, for controlling said actuator and said heating means such that 1) at times when the contaminated plastic waste is fed into said space, said control means controls said actuator to cause said ram to apply said first compaction pressure to the contaminated plastic waste, 2) upon said first compaction pressure being obtained, and while continuing to cause said ram to compact the contaminated plastic waste at said first compaction pressure, said control means activates said heating means to heat said housing walls, said ram, and said chamber hatch to said predetermined temperature, 3) upon said housing walls, said ram, and said chamber hatch reaching said predetermined temperature, and while continuing to cause said heating means to heat said housing walls, said ram, and said chamber hatch at said predetermined temperature, said control means controls said actuator such that said ram compacts the contaminated plastic waste at said second compaction pressure, and 4) upon the contaminated plastic waste exceeding said predetermined internal temperature, said control means deactivates said heating means and activates said cooling means while continuing to control said actuator such that said ram continuously compacts the contaminated plastic waste until said housing walls, said ram, and said chamber hatch cool to at least approximately 140° F.

15. A compress/melt waste processor as recited in claim 14, wherein said heating means comprises electric resistive elements disposed within said ram, said chamber hatch and said housing walls.

16. A compress/melt waste processor as recited in claim 14, wherein said heating means comprises electric resistive elements disposed around an outside surface of each of said ram, said chamber hatch and said housing walls.

17. A compress/melt waste processor as recited in claim 14, wherein said cooling means includes tubes disposed within said ram, said chamber hatch and said housing walls, said tubes having a cooling fluid passing therethrough.

18. A compress/melt waste processor as recited in claim 14, wherein said cooling means includes tubes disposed around an outside surface of each of said ram, said chamber hatch and said housing walls, said tubes having a cooling fluid passing therethrough.

19. A compress/melt waste processor as recited in claim 14, wherein said chamber hatch is slidably mounted upon said frame between a first position defining said chamber and a second position laterally removed from said first position and defining an opening such that when said chamber hatch is at said first position said ram acts to apply said first and second compaction pressures to said first volume of contaminated plastic waste to form said second volume of contaminated plastic waste wherein a ratio of said first volume to said second volume is approximately 30:1 and when said chamber hatch is at said second position said ram acts to eject the contaminated plastic waste from said chamber housing through said opening.

* * * * *